—FIG. 6.—

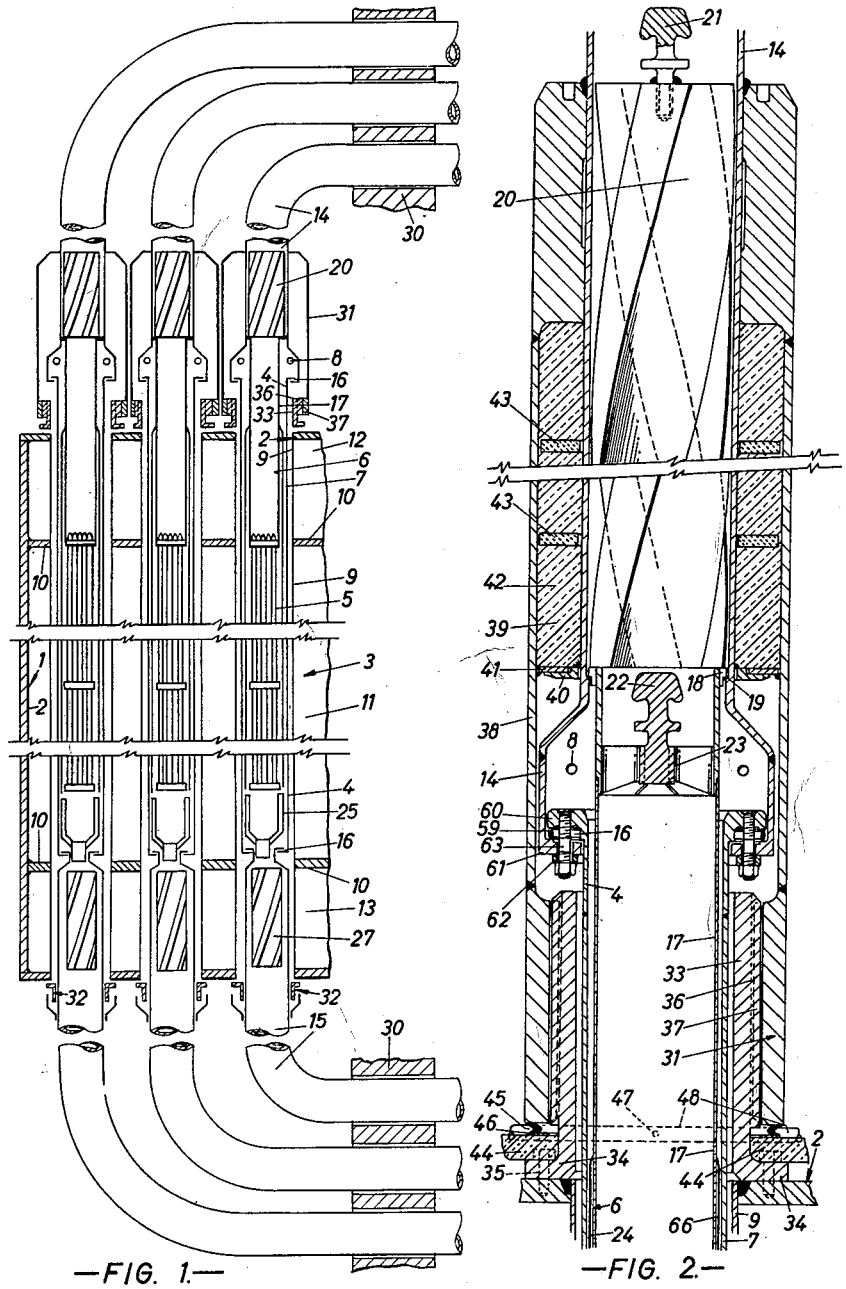

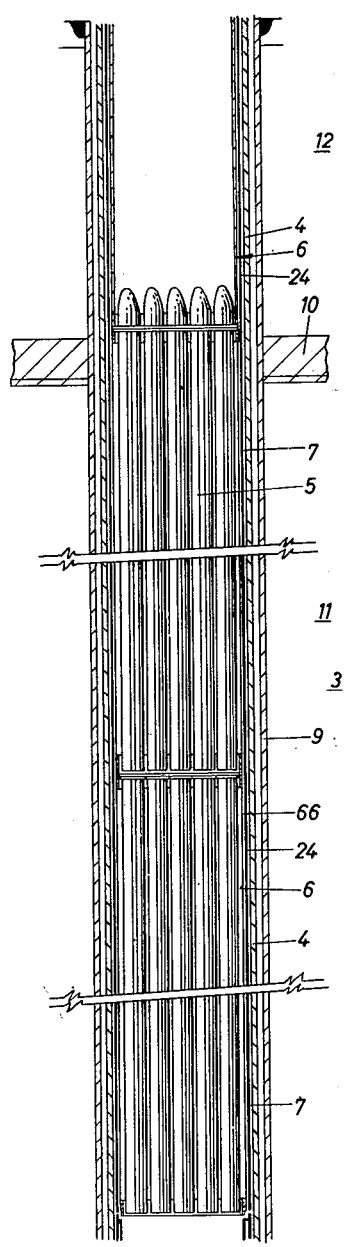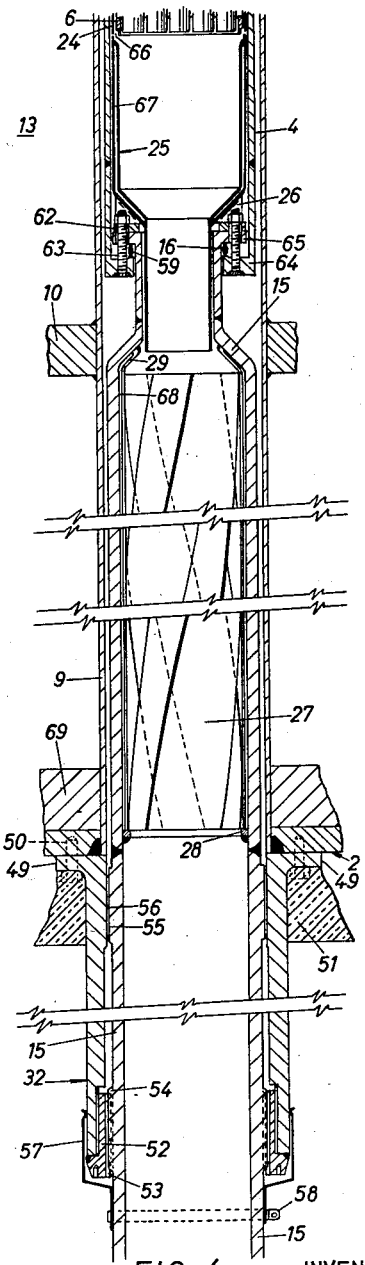
FIG. 3.
FIG. 4.
INVENTOR
NORMAN BRADLEY
BY
ATTORNEY

United States Patent Office 3,165,449
Patented Jan. 12, 1965

3,165,449
STEAM COOLED NUCLEAR REACTOR
Norman Bradley, Culcheth, near Warrington, England, assignor to United Kingdom Atomic Energy Authority, London, England
Filed Oct. 26, 1959, Ser. No. 848,721
Claims priority, application Great Britain June 10, 1959
3 Claims. (Cl. 176—59)

This invention relates to nuclear reactors of the kind having a liquid moderator.

It is usual in such reactors to have a tank defining channels and a liquid moderator in the tank so as to surround the channels. Where the reactor is cooled by a pressurised coolant, coolant pressure tubes can be provided passing through said channels with nuclear fuel elements in the pressure tubes.

The present invention provides a pressure tube arrangement having two advantages. On the one hand it provides reduced heat transfer to the moderator and, on the other hand, it provides protection for the pressure tube which is a highly stressed component that, in adverse circumstances, can become embrittled and which could cause substantial difficulty if it burst.

According to the invention a nuclear reactor of the kind having a liquid moderator and coolant pressure tubes is characterised in that the coolant pressure tubes each have a thin baffle member defining inner major flow channel containing fuel elements and annular minor flow channels between the baffle member and the inner wall of the tubes.

The annular flow channels provide paths resisting heat flow to the moderator and resisting heat flow to the pressure tubes whilst at the same time they provide passage for a fluid to remove heat from the pressure tubes.

Two embodiments of the invention will now be described by way of example with reference to the accompanying drawings wherein:

FIGURE 1 is a fragmentary side view in medial section, of a reactor according to one embodiment of the invention.

FIGURES 2, 3 and 4 are enlarged details of FIGURE 1.

Figure 5:
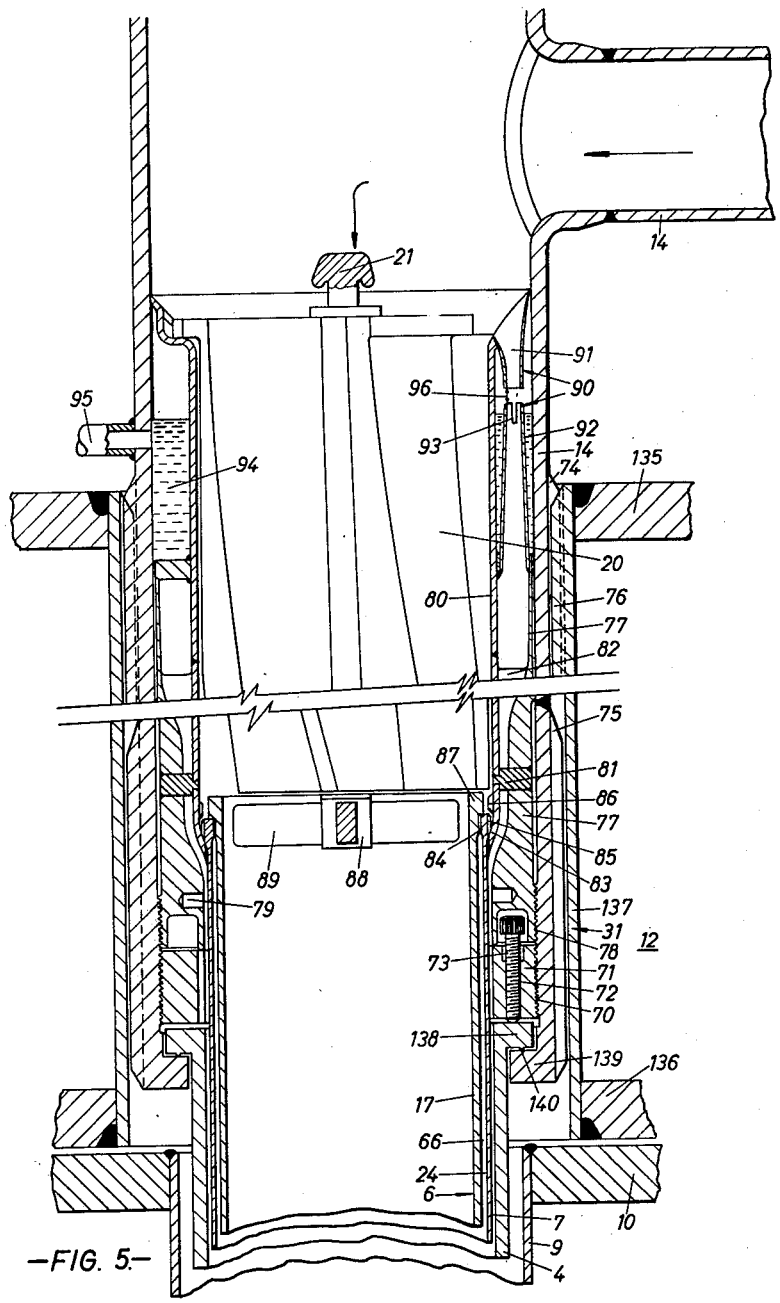
FIGURE 5 is a modification of the apparatus shown in FIGURE 2.

Referring to FIGURE 1, a steam-cooled, heavy-water moderated reactor 1 includes a tank 2 for containing the moderator 3, upright pressure resisting tubes 4 locating nuclear fuel elements 5, thin baffle members 6 carrying co-axial sleeves 24 spaced from the tubes 4 by narrow gaps 7, and ports 8 for injecting water into the gaps 7.

The moderator tank 2 is pierced by a series of tubular channels 9 which locate the tubes 4 and is divided into three horizontal sections by division plates 10, namely a centre section 11 containing the moderator 3 and upper and lower sections 12 and 13 respectively which contain light water for neutron shielding.

The tubes 4 are connected to coolant inlet and outlet pipes 14 and 15 respectively by demountable joints 16. The tubes 4 are of zirconium and the pipes 14, 15 of steel.

Referring now to FIGURES 2, 3 and 4, the baffles 6 enclose and support the fuel elements 5, the upper ends of the baffles 6 having extensions 17 with radial lugs 18 (FIGURE 2) which are supported by landings 19 formed in the lower ends of the inlet pipes 14. The upper ends of the sleeve extensions 17 provide support for neutron scatter plugs 20 which, whilst allowing a tortuous but unrestricted free flow to coolant, prevent the passage of neutrons with the coolant by scattering and absorption.

A full description of a neutron scatter plug is disclosed in application Serial No. 834,190, by E. Long and W. Rodwell, filed August 17, 1959, now Patent No. 3,132,998, granted May 12, 1964. The scatter plugs 20 may be raised and lowered by means of studs 21 attached thereto. Similar studs 22 attached to spiders 23 carried in the upper ends of extensions 17 allow raising and lowering of the baffles 6 and thus the fuel elements 5.

The sleeves 24 extend to the lower ends of the baffles 6. The upper ends of the sleeves 24, where attached to the baffles 6 are closed, the lower ends being open, spaces 66 between the sleeves 24 and baffles 6 being static, that is, not circulated by coolant, in order to reduce heat transfer between the fuel elements 5 and the zirconium tubes 4. Thus the tubes 4 are, in the main, subjected to heat by irradiation only, such as gamma-heating which is produced in a material when energy is given up by absorption of gamma-rays. Further static spaces 67 are provided within the double walls of sleeve members 25 disposed below the lower ends of the baffles 6 and sleeves 24. The sleeve members 25 are supported within the lower ends of the tubes 4 by brackets 26 carried by the upper ends of coolant outlet pipes 15.

The coolant outlet pipes 15 carry neutron scatter plugs 27 upon support rings 28 welded internally to the pipes 15. Sleeves 29 co-axial with the pipes 15 and with their ends welded thereto provide static spaces 68 between the plugs 27 and pipes 15.

Away from the tubes 4, the coolant pipes 14, 15 have a general run in a direction inclined at right angles to the axis of the tubes 4 and are constrained to move in this direction by restraint members 30 (FIGURE 1). With temperature changes taking place in the pipes 14, 15 during operation of the reactor, bending and twisting movements will tend to be applied to the tubes 4 and their joints 16. To prevent this, the pipes 14, 15 are secured near their respective joints 16 by upper and lower guide members 31, 32 respectively, the guide members 31, 32 functioning as supporting means and allowing lengthwise movement of the tubes 4 and pipes 14, 15 but resisting the application of bending and twisting moments to the tubes 4 and joints 16.

The upper guide members 31 (FIGURE 2) include fixed sleeve parts 33 embracing with clearance the upper ends of the channels 4. Flanges 34 of the sleeve parts 33 are rigidly secured by bolts 35 to the top of the moderator tank 2. The fixed sleeve parts 33 have external splines 36 for sliding engagement with internal splines 37 of movable sleeve parts 38 of square cross section. The upper ends of the movable sleeve parts 38 embrace the coolant inlet pipes 14 and are welded thereto. The movable sleeve parts 38 have internal recesses 39 closed by plates 40, 41 welded to pipes 14 and sleeve parts 38 respectively, the recesses 39 being filled with a mixture of graphite granules 42 and boron-steel plates 43. The close-packed sleeve parts 38 (FIGURE 1) combine to form a neutron shield above the moderator tank 2. The lower ends of the movable sleeve parts 38 (FIGURE 2) are sealed to the upper face of a heat-insulating slab 44 covering the top of the moderator tank 2, by bellows 45 mounted on seal-plates 46. The bellows 45 have apertures 47 connected to a common take-off pipe 48 leading to a detecting device so that out-leakage of reactor coolant from the joint 16 may be readily detected.

The lower guide members 32 (FIGURE 4) have upper flanged ends 49 rigidly secured to the bottom of the moderator tank 2 by bolts 50, the tank 2 being reinforced by a steel shielding plate 69. A heat-insulating slab 51 covers the bottom of the tank 2. Bush parts 52 screwed into the lower ends of the guide members 32 have internal splines 53 for sliding engagement with external splines 54 on the coolant outlet pipes 15. The pipes 15 also have raised surfaces 55 for sliding engagement with similar surfaces 56 on the guide members 32. Muffs 57 held to the pipes 15 by clamps 58 seal the guide members 32 to the pipes 15. The splines 53 on the bush part 52 are pitched slightly eccentric relative to the axis of the pipes 15 so as to correct any slight misalignment of the tubes 4 when fitted within the channels 9. The bush parts 52 are adjusted accordingly before the guide members 32 are secured to the bottom of the moderator tank 2, and are then welded to the guide members 32.

The joints 16 between the zirconium tubes 4 and the respective ends of the steel pipes 14, 15 provide for the differing coefficients of expansion of the two materials. Referring to FIGURE 2, a gasket 59 between flanged ends 60, 61 of a tube 4 and pipe 14 respectively is formed of sintered material, the composition of the material varying from one contact edge to the other in such a manner that the coefficients of expansion of zirconium and steel are matched sufficiently to eliminate differential expansion in a radial direction. A stainless steel backing ring 62 and high tensile steel clamping studs 63 match the expansion coefficients of steel and zirconium sufficiently to eliminate differential expansion in an axial direction. FIGURE 3 shows a similar joint 16 between flanged ends 64, 65 of a tube 4 and pipe 15 respectively.

When in operation, the reactor is cooled by a flow of steam coolant which enters the inlet pipes 14 in a saturated condition, the steam flow dividing out below each scatter plug 20 into a major coolant fraction passing down through the respective extension 17 and into the respective baffle 6 containing the fuel elements 5 and a minor fraction passing into the gap 7 external to the sleeve 24 to mix with water injected through the ports 8 in the lower end of the pipe 14. The mixture of steam and water passes on down through the gaps 7 absorbing heat from the walls of the tubes 4 as it does so. This heat is the result of the absorption of gamma-radiation by the tubes 4 and when given up results in the evaporation of the water contained in the mixture. Beneath the lower ends of the sleeves 24 the minor coolant fraction now wholly steam once more, but with slight superheat, rejoins the main fraction which has received superheat in passage over the fuel elements 5 and the combined flow then passes into the outlet pipes 15.

Figure 6:
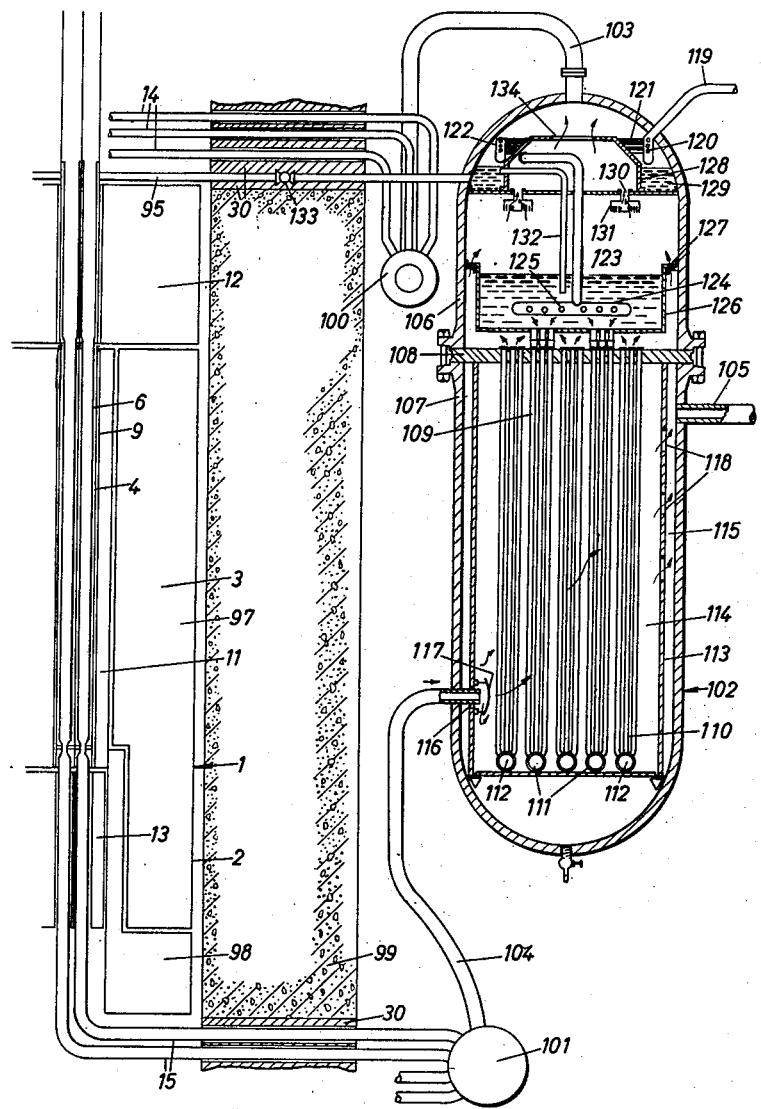
FIGURE 6 is a part-diagrammatic arrangement.

FIGS. 5 and 6 show various modifications to a joint 16, an upper guide member 31, and the method of injecting water into the gaps 7. Referring to FIGURE 5, in the arrangements shown, the light water shielding section 12 is contained in a separate shield tank having upper and lower tank plates 135 and 136 respectively, inter-connected by spacer-tubes 137. The zirconium pressure tubes 4 and steel pipes 14 have flanged ends 138, 139 respectively, the mating faces of the ends 138 of the tubes 4 each having an integral ring 140 of substantially triangular cross section. The lower end of the pipes 14 have internal screw-threaded portions 70 for engagement with screw threaded rings 71. The rings 71 each have a series of screw-threaded holes 72 (one of which is shown in FIGURE 5) for bolts 73 whose lower ends bear upon the back face of the flanged end 138 of the zirconium tube 4. With the rings 71 in the position shown, tightening of the bolts 73 results in the flanged ends 138 being rigidly clamped against the flanged ends 139 of the pipes 14. When the joints 16 become heated, for example during operation of the reactor, the rings 140 yield plastically to allow differential expansion of the tubes 4 and pipes 14 whilst maintaining a leak-tight joint.

The guide members 31 comprise in this particular embodiment, upper and lower splines 74, 75 respectively on the external surfaces of the pipes 14 together with the shield tank spacer tubes 137 and internal splines 76 thereon. The upper splines 74 on the pipes 14 engage with the splines 76 on the spacer tubes 137 to prevent the application of twisting moments to the tubes 4 and joints 16. The lower splines 75 on the pipes 14 have slight clearance with the inner walls of the spacer tubes 137, preventing substantial side movement of the pipes 14 and thus the application of bending moments to the tubes 4 and joints 16.

The sleeves 17 and the sleeves 24 spaced from baffles 6 by the static spaces 66 are supported from sleeve members 77 carried in the lower ends of the pipes 14, the sleeve members 77 having screw-threaded end portions 78 for engagement with internal screw-threaded portions 70 on the lower ends of the pipes 14. The sleeve members 77 each have holes 79 which serve as sockets for projections carried on a suitable tool so that they may be rotated to in order to be screwed down hard upon the upper faces of the rings 71.

Co-axial with the sleeve members 77 are sleeves 80 which are attached thereto by support studs 81 and stiffening ribs 82. The sleeves 80 have inwardly tapering lower ends 83 which provide support for enlarged ends 84 of the sleeves 24. The ends 84 of the sleeves 24 have external splines 85. External splines 86 of the same pitch as the splines 85 are provided on the lower ends of the sleeves 80. The splines 85, 86 are of large pitch so that when a sleeve 24 is lowered into its illustrated position and rotated slightly, the relative positions of the splines 85, 86 then prevent direct withdrawal of the sleeve 24. The upper faces of the enlarged ends 84 of the sleeves 24 support rings 87 integral with the upper ends of the sleeve extensions 17, the rings 87 supporting in turn neutron scatter plugs 20 having lifting studs 21. Spiders 88 with legs 89 extending to the inner walls of the sleeve extensions 17 provide for lifting and lowering of the latter and hence the fuel elements 5 (not shown) attached thereto.

The sleeve members 77 each carry three equi-spaced water injectors 90 of venturi form, the outlets of which discharge into the respective gap 7. Each of the injectors 90 comprises a nozzle 91 and pick-up duct 92, the latter having a longitudinal slot 93 at its upper end. A space defined by the sleeve 80 and the pipe 14 is filled with water supplied through a duct 95. As in the previously described embodiment, steam coolant entering the pipe 14 divides into major and minor fractions, the minor fraction in this particular embodiment passing through the water injectors 90 to entrain water spilling through the slots 93, the mixture of steam and water passing on into the gap 7 as before. It will be noted that the nozzles 91 and pick-up ducts 92 are separated by a gap 96. This is to allow an overflow of water into the pickup ducts 92 to become entrained with the steam emerging from the nozzles 91 should the slots 93 in the pick-up ducts 92 become blocked.

FIGURE 6 shows a part-diagrammatic arrangement for supplying water to the ducts 95 described above, and shows the reactor 1 shown in FIGURE 1 modified according to the embodiments shown in FIGURE 5 with the further addition of a side tank 97 for light water shielding, a moderator dump tank 98 and concrete biological shielding 99. Pipes 14 and 15 are shown connected to common headers 100 and 101 respectively, which headers are connected in turn to an evaporator 102.

The reactor 1 utilises the multi-pass coolant system described in application Serial No. 848,720, by N. Bradley, filed October 26, 1959, now Patent No. 3,091,582, granted May 28, 1963, the evaporator 102, pipes 14, 15 and tubes 4 shown in FIGURE 5 being part of the first pass of the system described therein. In operation, saturated steam generated in the evaporator 102 flows through a pipe 103 to the header 100 whence it enters the pipes 14 to flow along the tubes 4 comprising the first pass to receive superheat, the superheated steam then flowing into the header 101 by way of the pipes 15 and thence to the evaporator 102 through a pipe 104. Superheat is then given up in passage through the evaporator 102, the steam leaving the evaporator by way of a pipe 105 leading to a header (not shown) connected to a further series of pipes similar to the pipes 14, tubes similar to the tubes 4 and pipes similar to the pipes 15 comprising the second pass of the reactor.

The evaporator 102 comprises upper and lower shells 106 and 107 respectively, divided by a tube plate 108. The tube plate 108 is perforated by a series of down-corner tubes 109 and up-riser tubes 110, the tubes 109, 110 having inter-connected headers 111 and 112 respectively. The tubes 109, 110 are enclosed within a tubular baffle 113, the baffle 113 defining inner and outer spaces 114 and 115 respectively. The lower shell 107 of the evaporator is perforated to accommodate the pipe 104, the end of the pipe extending through an aperture 116 in the baffle 113. A plate 117 shields the end of the pipe 104 to prevent steam impingement on the tubes 109, 110. Steam flows from the pipe 104, over the tubes 109, 110 in the space 114 to enter the space 115 through apertures 118 in the baffle 113 and to leave the evaporator by way of the pipe 105.

Feed water first enters the evaporator 102 through a pipe 119 perforating the upper shell 106, the pipe 119 terminating in a header 120 from which extends a series of coils 121 connected to a header 122 diametrically opposite the header 120. A header outlet 123 connects the lower end of the header 122 with a coiled pipe 124 perforated by holes 125. The coiled pipe 124 is disposed within a feed water header tank 126 attached to the walls of the upper shell 106 by spaced brackets 127. The header tank 126 supplies the down-corner tubes 109 with feed water, the upper ends of the tubes 109 perforating the bottom of the header tank 126, being secured thereto in a sealing manner.

Above the header tank 126, a number of steel plates form an enclosure 128, the sidewalls which define a space 129 with the upper inner walls of the upper shell 106. The side walls of the enclosure 128 are perforated to accommodate the feed outlet pipe 123 leading from the header 122 to the coiled pipe 124 in the header tank 126. The outlets 130 of a pair of steam driers 131 discharge into the enclosure 128 which communicates with the interior of the shell 106 by way of an aperture 134. Saturated steam generated in the upriser tubes 110 flows upwardly and around the header tank 126, through the steam driers 131, into the enclosure 128 and through the aperture 134 therein to leave the evaporator 102 by way of the pipe 103. Steam collecting in the upper part of the shell 106 condenses on the relatively cold feed water coils 121, the condensate collecting in the space 129 whence it flows to the reactor coolant pipes 14 by way of the horizontally disposed inter-connecting duct 95. The level of condensate in the space 129 is limited by an overflow 132 which spills into the header tank 126.

Condensate flows along the duct 95 under a slight static head having a maximum value corresponding to the vertical distance between the overflow 132 and the duct 95, and is assisted by the steam pressure drop between the pipe 103 and the pipes 14. Flow control may be affected by a valve 133, but under normal conditions the rate of flow varies automatically with the reactor load. This is because the pressure drop of steam between the pipe 103 and the evaporator 102 and the reactor pipes 14 varies as the square of the reactor load represented by the heat output. As the pressure drop of the condensate along the duct 95 varies in accordance with steam pressure drop between the pipe 103 and pipes 14, the rate of condensate flow along the duct 95 varies according to the reactor load. Thus the amount of water injected into the gaps 7 between the tubes 4 and baffles 6 varies according to the intensity of head and thus of radiation emitted by the reactors.

Figure 7:
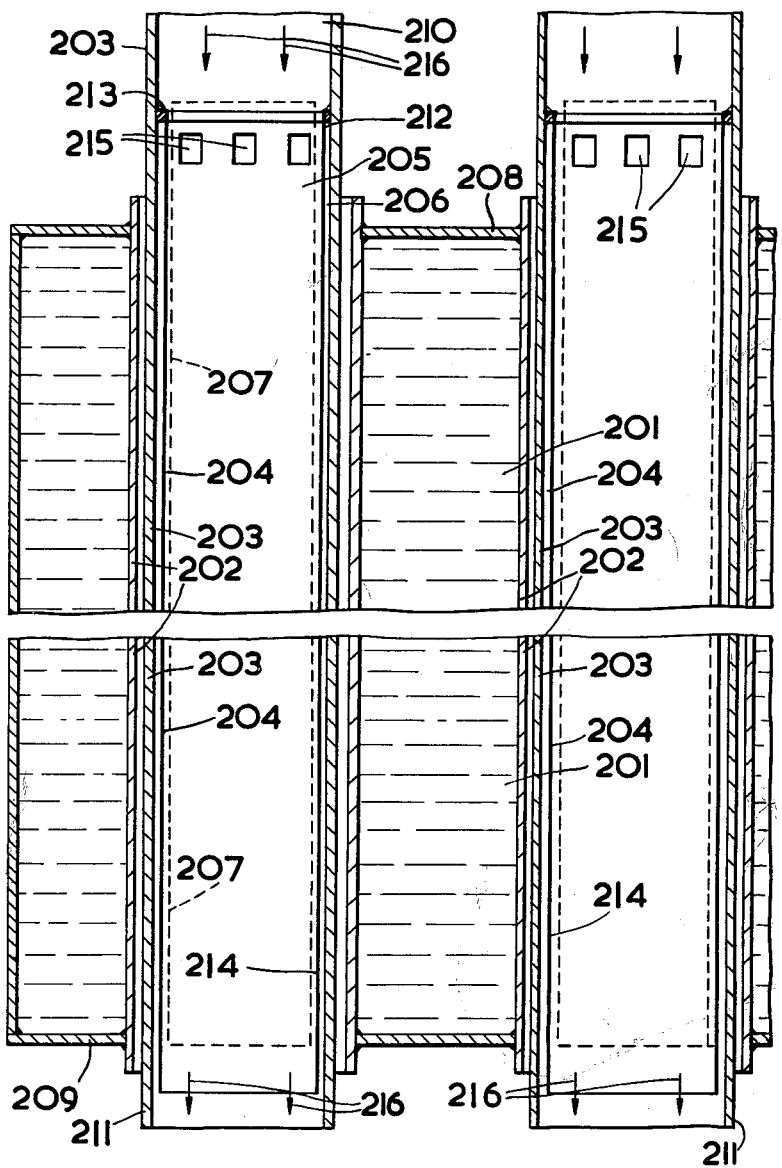
FIGURE 7 is a fragmentary side view in medial section of a further embodiment.

A further embodiment of the invention is shown in FIGURE 7 wherein an aluminum moderator tank 201 of a liquid (for example, heavy water) moderated, gas (for example, steam or $CO_2$) cooled nuclear reactor is pierced by a series of open-ended aluminium tubular channels 202 and has a zirconium coolant gas pressure tube 203 in a spaced relationship within each channel 202. Each pressure tube 203 contains a tubular baffle member 204 of zirconium, the baffle member 204 serving as a partition and defining inner and outer coolant flow channels 205 and 206 respectively, the inner channels 205 each containing nuclear fuel elements (not shown) within tubular housings 207. The channels 202 pierce the tank 201 through top and bottom tank plates 208 and 209 respectively and are welded thereto. The tubes 203 are swept by coolant gas entering an upper end 210 and leaving at a lower end 211, as indicated by the arrows 216. Each tubular baffle member 204 is shown as a thin-walled sleeve or liner and has its upper end 212 welded to a spacer ring 213 attached to the upper end 210 of respective tube 203, the lower end 214 of the baffle 204 being open-ended. A circumferential ring of ports 215 in the upper end 212 of the baffle 204 allow communication between passages 205 and 206.

When the reactor is in operation, a flow of coolant gas under pressure is caused to pass downwards through each pressure tube 203, the flow dividing out so that a major portion of the flow passes over the fuel elements within the housing 207 disposed in the channel 205 and a minor portion passes through the ports 215 to sweep the channel 206. The gas flow combines once more below the open end 214 of the baffle 204.

By this arrangement, the greater portion of heat generated by the fuel elements 207 is removed by the coolant flow through channels 205, the major portion of any remaining heat conducted through the walls of baffles 204 being removed by coolant flow through the channels 206. Any small amount of heat reaching the outer walls of the tubes 203 is discouraged from passing into the moderator within tank 1 by the barriers formed by the annular spaces between channels 202 and tubes 203, which spaces form "atmospheric" gas gaps.

Although the present embodiment shows and describes a thermal gas barrier between the channels 202 and tubes 203, this space could be swept by a flow of coolant "tapped off" the tubes 203 or supplied independently.

What is claimed is:

1. A steam cooled nuclear reactor comprising a tank having defined therein a lattice of vertically oriented channels in parallel array through the tank; a liquid moderator in the tank surrounding the channels; steam conducting pipes passing lengthwise through said channels; fuel elements in said steam conducting pipes; open ended barrier tubes in the steam conducting pipes between the steam conducting pipes and the fuel elements contained therein and spaced from both the steam conducting pipes and the fuel elements; means to cause steam coolant to flow through the steam conducting pipes; means at one end of the barrier tubes to cause the steam coolant flowing through the pipes to divide into a major fraction passing inside the barrier tubes and over the fuel elements and a minor fraction passing outside the barrier tubes and along the inner walls of the pipes; means at the other end of the barrier tubes causing the major and minor fractions to reunite; and means at the said one end of the barrier tubes for entraining water to mix with the minor fraction of steam coolant.

2. A steam-cooled reactor as claimed in claim 1 wherein a water reservoir is provided between the steam conducting pipes and the barrier tubes at the said one end of the barrier tubes and the means for entraining water comprises injector pipes extending upwardly through said reservoir, the injector pipes being open at one end at the surface of the water in the reservoir and open at the other end to the spaces between the barrier tubes and steam conducting pipes below the reservoir and steam nozzles directed towards those ends of the injector pipes which are at the surface of the water.

3. A steam-cooled reactor as claimed in claim 2 wherein means are provided for supplying said reservoir with a condensed fraction of the steam coolant according to the reactor load.

References Cited in the file of this patent

UNITED STATES PATENTS

| | | |
|---|---|---|
| 2,644,396 | Billman | July 7, 1953 |
| 2,832,733 | Szilard | Apr. 29, 1958 |
| 3,031,388 | Barchet | Apr. 24, 1962 |

FOREIGN PATENTS

| | | |
|---|---|---|
| 286,658 | Switzerland | Mar. 2, 1953 |
| 792,171 | Great Britain | Mar. 19, 1958 |

OTHER REFERENCES

Proceedings of the International Conference on the Peaceful Uses of Atomic Energy, Geneva, Aug. 8–20, 1955, New York, United Nations, 1955, vol. 3, pages 345–348.

Proceedings of the International Conference on the Peaceful Uses of Atomic Energy, Geneva, Aug. 8–20, 1955, New York, United Nations, 1956, page 345. Article by Yvon.

TID–7529 (Part 1), Book 1, November 1957, pp. 248–50, 254.